United States Patent [19]

Cook

[11] Patent Number: 4,988,166
[45] Date of Patent: Jan. 29, 1991

[54] SIGHTING ARRANGEMENTS

[75] Inventor: Paul J. Cook, Stanwell, Great Britain

[73] Assignee: Samuelson Group plc, London, England

[21] Appl. No.: 230,832

[22] PCT Filed: Feb. 6, 1987

[86] PCT No.: PCT/GB87/00089
§ 371 Date: Oct. 7, 1988
§ 102(e) Date: Oct. 7, 1988

[87] PCT Pub. No.: WO87/04805
PCT Pub. Date: Aug. 13, 1987

[30] Foreign Application Priority Data

Feb. 7, 1986 [GB] United Kingdom ............... 8603054

[51] Int. Cl.$^5$ .................... G02B 27/00; G02B 7/00
[52] U.S. Cl. .................... 350/321; 350/319;
350/255; 350/636; 356/251; 358/250
[58] Field of Search ............ 350/321, 255, 318, 621,
350/632, 635, 636, 319, 174; 358/185, 250;
356/251, 255; 362/37, 39, 53, 54, 55, 56

[56] References Cited

U.S. PATENT DOCUMENTS

| 2,998,744 | 9/1961 | Wiese . | |
|---|---|---|---|
| 3,137,769 | 6/1964 | Yates et al. | 356/251 |
| 3,524,710 | 8/1970 | Rickert | 356/251 |
| 3,663,112 | 5/1972 | Jones et al. | 356/251 |
| 4,162,124 | 7/1979 | Feldman et al. | 356/255 |
| 4,193,666 | 3/1980 | Cojan . | |
| 4,283,860 | 8/1981 | Rucker . | |
| 4,346,995 | 8/1982 | Morris | 356/251 |
| 4,400,731 | 8/1983 | Brown | 358/250 |
| 4,526,447 | 7/1985 | Taylor | 350/636 |
| 4,527,198 | 7/1985 | Callahan | 358/185 |
| 4,750,486 | 6/1988 | Butler et al. | 350/636 |
| 4,764,011 | 8/1988 | Goldstein | 356/251 |

FOREIGN PATENT DOCUMENTS

| 2331423 | 1/1975 | Fed. Rep. of Germany . |
| 2060115 | 6/1971 | France . |
| 2523732 | 9/1983 | France . |
| 1542925 | 3/1979 | United Kingdom . |
| 2132329 | 7/1984 | United Kingdom . |

Primary Examiner—Bruce Y. Arnold
Assistant Examiner—Loha Ben
Attorney, Agent, or Firm—Price, Heneveld, Cooper, DeWitt & Litton

[57] ABSTRACT

A sight for aiming a spotlight on a particular target, such as a performer on stage, has a partially reflective panel supported on the spotlight in an inclined position through which the operator can see the target, and sight also includes a light source which, by means of a mirror, is reflected onto the panel. The light from this source passes through an adjustable lens and, by adjusting the position of the mirror and the lens, the operator can cause the virtual image visible on the panel to correspond with the target as seen through the panel thereby informing him that when the beam of the spotlight when used will be directed onto the target, 20 Claims, 3 Drawing Sheets

SIGHTING ARRANGEMENTS

The present invention relates to sighting arrangements, more particularly, to an arrangement for sighting or aiming optical equipment such as a primary light source in which a point of light is directed against a mirror which reflects it through a focusable lens to a partially reflective panel through which an operator can see the target to be sighted and on which he can also see the point of light and, by manipulation of the equipment, he can properly align the target and the point of light so that the primary light source, when used, is directed at the target.

FIELD OF THE INVENTION

An example of lighting equipment which requires particular attention to sighting or aiming is a theatrical follow spot. This is the type of lantern which will be used to project light onto a relatively small area (for example, the face of an actor or performer) from some considerable distance. Follow spots, for example, are used for "show throw" applications operating at a range of, say, up to 30 m, or "long throw" applications operating at a range of, say, 30 to 100 m or even more. The operator of a follow spot is often called upon to illuminate a target point such as an actor's face in an otherwise unlit or partially lit auditorium. That involves lining up on the target point before activating the spotlight. Various attempts have been made to enable a follow spot operator to do this with greater or lesser degrees of success. For example, sighting points located on the barrel of the spotlight have been used, as have telescopic sights. These, however, suffer the disadvantage of inconvenience and discomfort in use, and also prevent the operator from seeing what else may be going on around him while he has his eye in the sighting position. Other arrangements which have been tried include the use of a beam leaked from the lamp of the spotlight, the leaked beam being focussed, e.g. onto the ceiling above the operator. The operator sights or aims at the spotlight by aligning the leaked beam on a mark or element of the ceiling. That has the disadvantage of requiring each aiming point individually to be determined in advance, thus failing to provide for onstage variations, last minute changes or whatever.

In the absence of a sighting device, operators of follow spots on occasion indulge in a practice known as "shadowing" which entails flashing the light onto the auditorium as briefly as possible to aim the beam in the hope that the audience will not notice the flash.

The present invention seeks to provide, among other things, an arrangement whereby a spotlight may be aimed through sighting means, which means in their relationship with the spotlight avoid or at least minimize the various disadvantages of the known prior arrangements or techniques.

BRIEF DESCRIPTION OF THE INVENTION

According to the present invention there is provided a spotlight sight comprising a partly reflective panel through which an operator may view a target area, imaging means arranged to produce a virtual image of a light source, as seen in the panel, at or near the target area, adjustable focussing means arranged to enable the visual image to be located at a selected distance from the panel, corresponding to the distance of the target area, the said selected distance being variable between substantially infinity and a closer distance, and the panel being adjustable to effect adjustment of the horizontal and vertical position of the virtual image as seen in the panel.

By ensuring that the image of the light source appears at the required throw, parallax error may be substantially eliminated between the virtual image of the light source and the target, so that the position of the eye of the operator is not critical to sighting. Indeed the arrangements can be set up such that the operator may confirm that his sighting is accurate by moving his head from side to side or up and down. The removal of the parallax error will result in the light source image at the target appearing to move together with the movement of the operators head. The sight may include an angled mirror positioned between the light source and the panel. The advantage of this is that the light source may be positioned off-axis, so limiting the distance between the light source and the panel. This may be advantageous in situations where little headroom is available. The mirror may be adjustable, for example in position and/or in angle, desirably by means of three sprung screws abutting either the mirror itself or a mirror mount. This is a convenient means of optically centering the position of the light source, by the manufacturer, before the sight leaves the factory. Alternatively, or in addition to an adjustable mirror, the position of the light source may itself be adjustable, for example by its being mounted on an adjustable mount. As with the mirror, the mount may be abutted by three sprung adjusting screws.

Desirably, a colored filter is positioned between the light source and the panel. This may be replaceable, so that the color of the virtual image may be arranged to contrast with the target or with the color of the illumination.

The sight may also include mounting means arranged to mount the sight on a spotlight for rotational adjustment with respect thereto. This enables the sight easily to be positioned according to the size of the operator and the preferred position of his head with relation to the spotlight housing.

The adjustable focusing means may comprise a screw-threaded convex lens position between the light source and the panel, desirably between the mirror and the panel. The lens may be screw-threaded into one end of a generally cylindrical housing, the light source and/or the mirror being located at the other end.

The panel may be adjustable by rotation about three axes, for further flexibility. It may also be adjustable in position with respect to the light source, for example by its being mounted on an adjustable, lockable telescopic arm. This arm is preferably positioned generally vertically, and may be attached to the side of the cylindrical housing.

The light source itself may be a substantially point source, for example the emission end of an optical fiber. Alternatively, it may be an extended source (for example a grid). In the latter case, the imaging means may be arranged to produce a virtual image which is adapted to indicate the area of the target which will be illuminated. This image may be annular, and continuously or stepwise adjustable in size. The size of the annular image could be selected, either manually by the operator or alternatively automatically according to the area which will be illuminated when the spotlight is switched on. This could be done, for example, by arranging for the size of the image to be dependent upon the output of one or more sensors incorporated into the spotlight and sensitive to its focusing and/or to its shuttering.

According to a second aspect of the invention there is provided a spotlight sight comprising a partly reflective inclined panel through which an operator may view a target area, an elongated housing having, at or near an end nearest the panel, imaging means comprising an adjustable screw-threaded convex lens, and at or near an end furthest from the panel an inclined mirror, and a light source, positioned off the housing axis and directed towards the mirror, the imaging means being arranged to produce a virtual image of the light source, as seen in the panel, at or near the target area, and the panel being adjustable to effect adjustment of the horizontal and vertical position of the virtual image as seen in the panel.

According to a further aspect of the invention, a spotlight includes a spotlight sight as previously defined. In such a spotlight, the light source of the sight is desirably derived from the lamp of the spotlight itself, for example via an optical fiber. In this form of the invention it will be appreciated that references to the positioning of the light source refer to the positioning of the emission end of the optical fiber rather than to the lamp itself.

According to a further aspect of the invention a kit of parts for a spotlight sight comprises a partly reflective panel through which an operator may view a target area, a light source, and imaging means arrangeable to produce a virtual image of the light source in the panel.

With any of the above arrangements, the imaging means could be arranged to produce a second virtual image, in the panel, including other information which may be of use to the camera, microphone or spotlight operator. This may include, for example, aperture or shutter settings.

It will be appreciated that any of the above described features either alone or in combination, may be used in connection with the invention.

The invention may be embodied in a variety of ways, and several embodiments will now be described, by way of example, with reference to the accompanying drawings (which show in particular an embodiment for use with a theatrical follow-spot), in which:

DESCRIPTION OF THE PREFERRED EMBODIMENT

Figure 1:
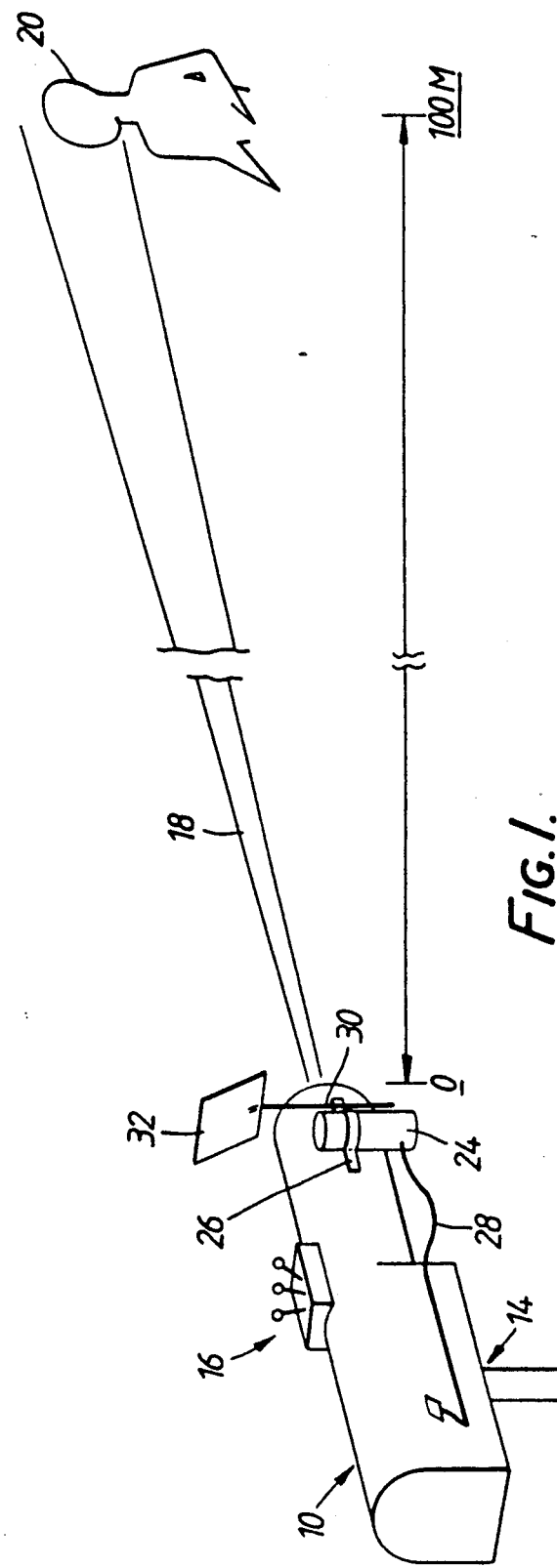
FIG. 1 is a somewhat stylized perspective view of a follow spot having attached to it sighting means according to the present invention.

Referring to the drawings, there will be seen at 10 in FIG. 1 a follow spot. For theatrical use, this will usually be provided with an arc lamp (not shown) within its housing of output in the range of 350 watts to 3 kilowatts. The follow spot is mounted on a castored dolly 12 and has a point of articulation 14 so that it may be panned and tilted as required to follow a performer. At 16 will be seen several levers for mechnical control of the light iris and shutter arrangements. Lights of this type are normally left running for the time in which they may be required, the light beam being interrupted by a shutter rather than cause damage to the lamp by switching it on and off.

A narrow angle hard edge beam is shown at 18, the beam providing a disc of light sufficient to illuminate the head 20 of a performer at a distance in the region of 100 m.

Attached to the side of the housing of the spot 10 is a cylinder 24. The means by which the cylinder 24 may be affixed to the spot 10 here is shown as a simple clamping strap 26 for ease of depiction. In a preferred form, though, an arrangement will be provided so that the position and angle of the cylinder 24 to the spot 10 may be varied at will, (for example, the cylinder may be so mounted that it can be independently rotated in a plane parallel to the housing axis and in a plane perpendicular to that axis). Running from a point in the spot 10 adjacent the lamp is an optical fiber 28 which carries a small proportion of the output of the main lamp to the cylinder 24 as will be described further below.

Affixed to the cylinder 24 is a vertical telescopic support 30 for a flat rectangular perspex sheet 32.

Figure 3:
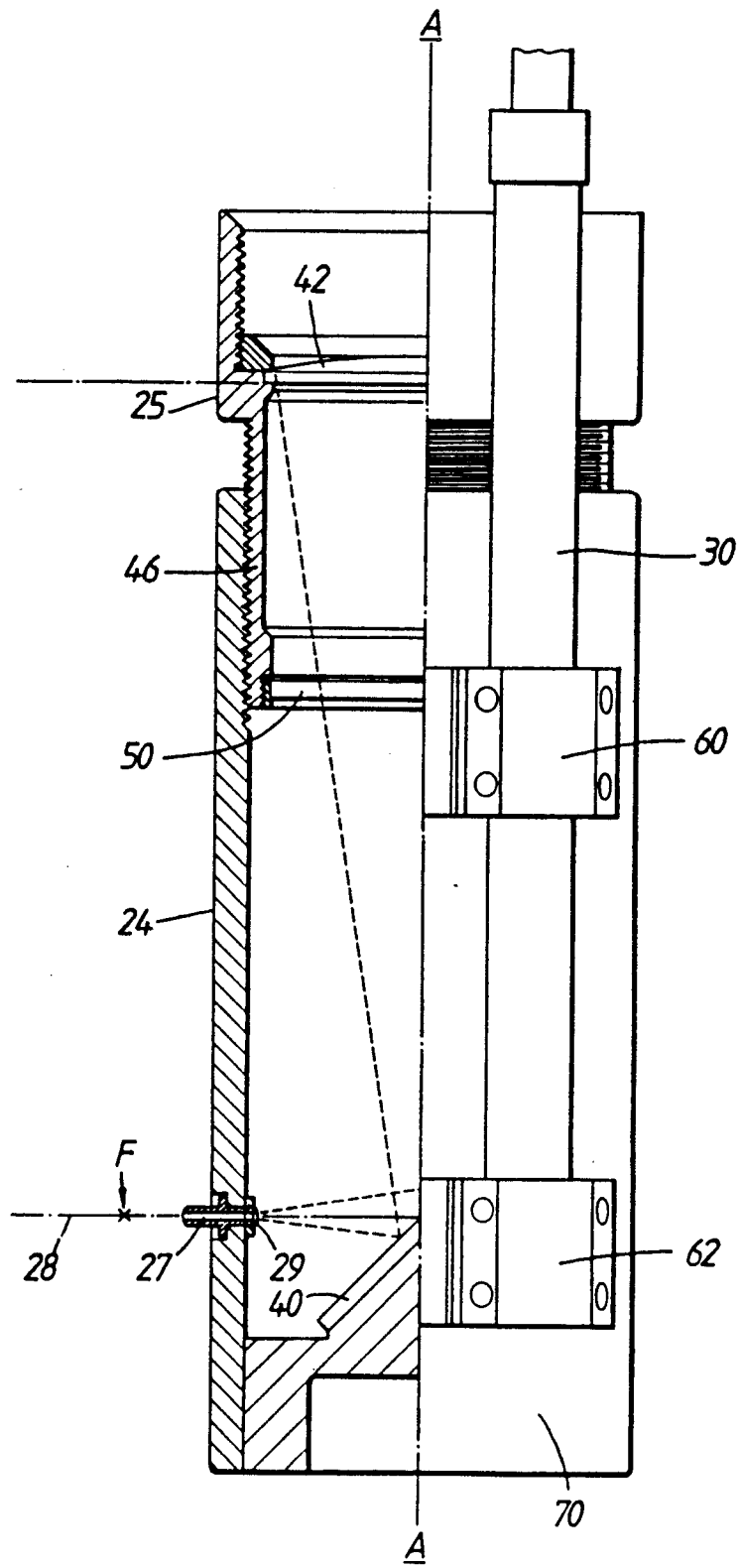
FIG. 3 is a profile, partly in section, of the light source and focussing means as shown in FIG. 1.
Figure 5:
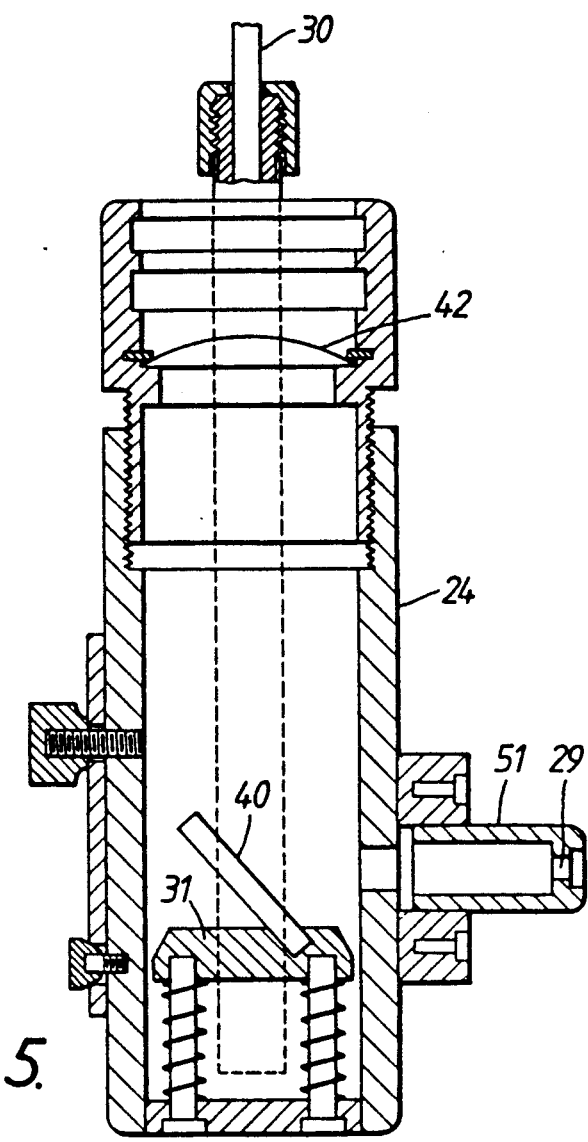
FIG. 5 is a longitudinal section through another embodiment.

Coming now to FIG. 3 it will be seen that the cylinder 24 is provided with a terminal 27 for the optical fiber 28, the part of the terminal 29 on the inside of the cylinder 24 in effect proving a point light source, of course, when the main power lamp is illuminated. Of course, an independent light source could equally well be used at 29. The point light source 29 is directed towards the mirror 40 arranged substantially at 45° to the cylinder axis A—A. This mirror is adjustable in the position and angle by means of three generally equidistant sprung screws (not shown) abutting its rear face. In an alternative arrangement (shown in FIG. 5) the mirror is mounted on an adjustable support 31, again having three sprung screws for the rotation and/or positional adjustment thereof.

The light emitting from the optical fiber 28 is shown in broken lines on the left-hand side of FIG. 3, being reflected by the mirror 40 up to a plano-convex lens 42. The lens 42 is located in an extension 25 of the cylinder 24. The extension 25 and the cylinder 24 have between them at 46 interengaging threads such that rotation of the extension 25 with respect to the cylinder 24 about the axis A—A will cause the extension 25, and consequently the lens 42, to move towards or away from the cylinder 24, again along the line of the axis A—A. That threaded engagement 46 thereby provides the lens 42 with focusing means.

A plano-convex lens is preferred, both for simplicity and ease of construction. However, more complex lens sets may be used in appropriate circumstances although usually with a cost and/or convenience penalty. A spill ring 50 is provided as is conventional to cut down on lens edge aberrations.

In an alternative arrangement (FIG. 5) the light source is positioned at the end of a perpendicular subsidiary cylinder 51, attached to the main cylinder and opening into it. Such an arrangement has the advantage that the optical path length between the source 29 and the lens 42 can be substantially longer than the length of the cylinder 24, so limiting the overall height of the device. This may be of importance in situations in which a theatrical follow-spot has to be used in areas with little headroom.

Between the source 29 and the lens 42 (conveniently between the source and the mirror 40, at the end of the subsidiary cylinder 41 if one is provided) is a replaceable gel filter (not shown).

Figure 4:
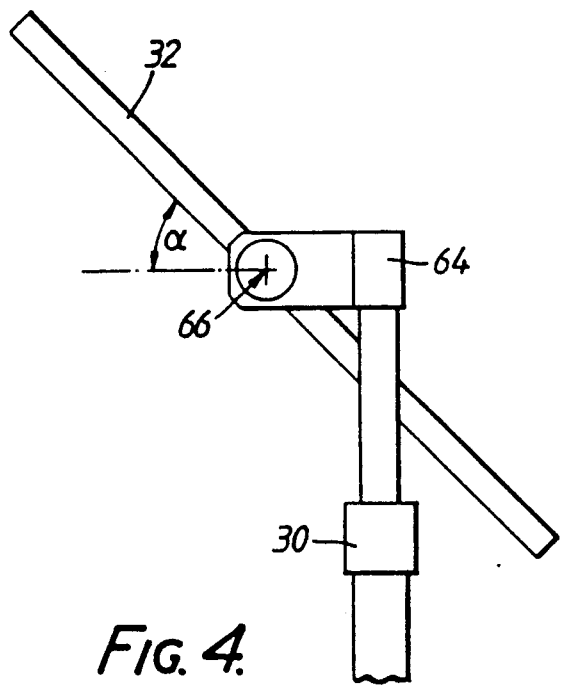
FIG. 4 is a profile showing the mounting point for the transparent panel/screen shown in FIG. 1 of the invention.

On the right-hand side of FIG. 3 there is shown part of a telescopic support 30 affixed to the body of the cylinder 24 by brackets 60, 62. Turning now to FIG. 4, the upper end of the telescopic support 30 is shown. It has, at its head, a lateral extension 64 to which is mounted pivotally the perspex sheet 32. Each of the joints of the telescopic support 30 is provided with means to lock or unlock them for movement, either axial extension or rotation, and the perspex panel 32 is fixed to the lateral extension 64 about its pivot axis 66, again so that it may be moved or clamped. Preferably a guide scale is provided for easy adjustment of the panel angle to the intended throw.

The attachment of the perspex sheet 32 to the support 30 allows not only rotation about the axis 66 of FIG. 4 but also rotation about the vertical axis and the orthogonal horizontal axis. Accordingly, the sheet 32 has three rotational degrees of freedom, and at least one translational degree of freedom (on extension of the support 30). Of course, the perspex sheet may be supported to have other translational degrees of freedom as well.

The operation of the sighting arrangement is as follows.

With the lamp of the follow spot 10 lit, there will, in effect, be a point light source at 29. The light from that light source 29 passes through the filter (not shown), is reflected up to the lens 42 by the mirror 40 and from there up to the surface of the perspex sheet 32 facing the cylinder 24. The operator of the follow spot 10 will normally be positioned towards the rear of the follow spot 10 and on the right-hand side, that is to say the same side as the spot 10 as the cylinder 24 etc. If a left-handed operator particularly so requires, the arrangement can be such that the cylinder 24 etc. can be moved to the opposite side of the follow spot without in any way affecting the principle of operation of the present invention.

Figure 2:
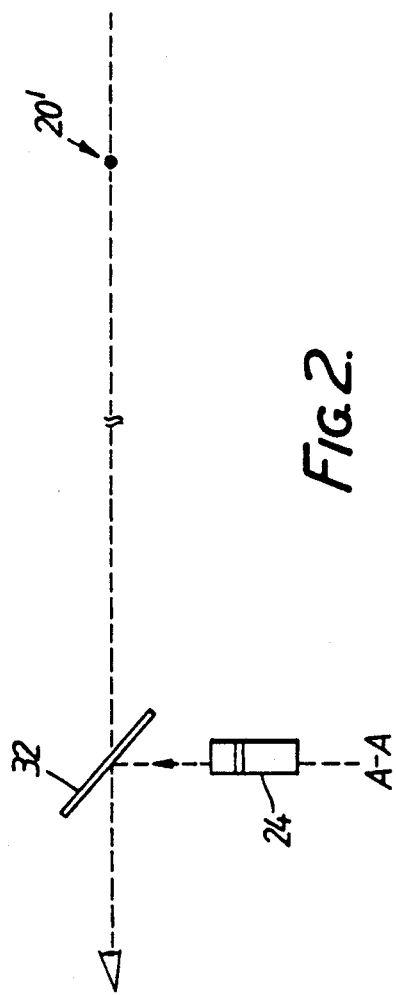
FIG. 2 is a schematic diagram showing the method of sighting of the present invention.

During a rehearsal the operator will open the spot shutter (not shown) using the appropriate one of the levers 16 to cast a disc of light of the required diameter onto the target spot (the head 20 or the 20' as shown in FIG. 2). He will then adjust the height of the sheet 32 (and, if necessary the position of the sheet in other directions, either by adjusting the sheet mounting 64 or by tilting the whole cylinder 24), so that he can see the light disc at point 20 through the transparent perspex sheet 32. Because of the reflective properties of the surface of the perspex sheet 32 he will also then have in his vision (subject to any necessary adjustments to the angular position of the sheet), an image of the light source 29 reflected towards him by the surface of the sheet 32. By altering the position of the lens 42 by use of the thread engagement 46 he can place the virtual image of the light source 29 at the same position in space as the target point 20, 20'. He can determine whether that adjustment has been made correctly by moving his head from side to side or up and down. If the focussing has been carried out correctly he will have eliminated the relative movement of that virtual image and the target point, which would otherwise be attributable to the parallax change caused by the movement of his head.

Once he has achieved that substantially zero parallax error, he can then, if necessary, re-adjust the position and angle of the sheet 32 (and/or of the cylinder 24, if required) such that the virtual image of the light source 29 appears in the middle of the projected light disc from the lamp of the follow spot 10. Once he has that he can interrupt the light beam 18 by use of appropriate lever 16 to operate the shutter/iris arrangements. If the operator then wishes to aim the spot at a different target point 20, 20', he merely has to move the follow spot 10 and with it the sighting arrangement 24-32 until he sees the light source image through the sheet 32 at the desired target point. He can then switch on the light beam 18 and it will be illuminated the required target point without the need for further adjustment.

The purpose of the filter or gel is so that the color of the image can be arranged so that it contrasts with the background and/or the color of the illumination being used. If is found, in practice, that a red filter is convenient for many uses.

The sighting arrangement gives a considerable degree of flexibility to accommodate comfortably operators of widely varying height and/or bulk, and operating styles as compared e.g. with use of simple sighting points on the spot barrel.

In further forms of the invention (not shown) the light source 29 may be placed on the bottom of the cylinder 24 at 70 and the mirror dispensed with.

In this arrangement means (not shown) are desirably provided to position the source 29 and/or, if the source is not a point source, to angle it. This is conveniently achieved by mounting the source on an adjustable block. Use of a mirror is, however, preferred since it may be easier to adjust the apparent position of the source, and it also has the further advantage that the overall height of the cylinder 24 can be limited. Without the mirror, the cylinder has to be sufficiently long to encompass the focal point of the lens 42.

The focal point of the lens 42 via the reflection in the mirror 40 is desirably at a point F upstream of the light source 29. The distance from the light source 29 the lens 42 should be less than or equal to the focal length of the lens 42 (or lens group to replace the lens 42) so that the arrangement can be focussed (by movement of the lens 42) both on objects at infinity and also on nearer objects. It is preferably less than that distance as shown on FIG. 3.

On manufacture of the unit, the mirror 40 or the position of the light source 29, where appropriate, is adjusted so that the light source (or image thereof) lies on the optical axis of the lens 42, and appropriate distance away from the lens.

In a further form (not shown) the spot 10 is provided with a tungsten filament lamp. Tungsten lamps are switched on and off between periods of use, so the lamp itself cannot be used to provide the light source for the sighting arrangement. The terminal 27 will therefore be replaced with a suitable light source e.g. a 100 watt bulb.

I claim:

1. A sight for use with a spotlight, said sight comprising a partly reflective panel through which an operator may view a target area, said panel being transverse to an axis of a light beam emitted from a light source and inclined with respect to said axis thereof, said sight having said light source and an imaging means arranged to produce a virtual image of the light beam from said source on the panel, at or near the target area as seen through the panel, said imaging means including an adjustable focusing means arranged to enable the virtual image to be located at a selected distance from the panel corresponding to the distance of the target area, said selected distance being variable between substantially infinity and a closer distance, and means for adjusting the position of the panel to effect adjustment of horizontal and vertical positions of the virtual image as seen in the panel.

2. A sight for use with a spotlight as claimed in claim 1 including an adjustable angled mirror positioned between the light source and the panel.

3. A sight for use with a spotlight as claimed in claim 2 in which the light source is mounted on an adjustable mount.

4. A sight for use with a spotlight as claimed in claim 3 in which the light source is the emission end of an optical fiber.

5. A sight for use with a spotlight as claimed in claim 2 including a replaceable filter positioned between the light source and the panel.

6. A sight for use with a spotlight as claim in claim 2 including a spotlight and mounting means arranged to mount the sight on said spotlight for rotational adjustment with respect thereto.

7. A sight for use with a spotlight as claimed in claim 2 in which the panel is adjustable by rotation about three axes.

8. A sight for use with a spotlight as claimed in claim 7 in which the panel is mounted on an adjustable, lockable telescopic arm.

9. A sight for use with a spotlight as claimed in claim 1 in which the light source is mounted on an adjustable mount.

10. A sight for use with a spotlight as claimed in claim 9 in which the adjustable focusing means comprises a screw-threaded convex lens positioned between the light source and the panel.

11. A sight for use with a spotlight as claimed in claim 1 including a replaceable filter positioned between the light source and the panel.

12. A sight for used with a spotlight as claimed in claim 1 including a spotlight and a mounting means arranged to mount the sight on the spotlight for rotational adjustment with respect thereto.

13. A sight for use with a spotlight as claimed in claim 1 in which the adjustable focusing means comprises a screw-threaded convex lens positioned between the light source and the panel.

14. A sight for use with a spotlight as claimed in claim 1 in which the panel is adjustably by rotation about three axes.

15. A sight for use with a spotlight as claimed in claim 1 in which the panel is mounted on an adjustable, lockable telescopic arm.

16. A sight for use with a spotlight as claimed in claim 1 in which the light source is the emission end of an optical fiber.

17. A sight as claimed in claim 1 in combination with a spotlight, said spotlight having a source of light therein.

18. A sight as claimed in claim 17 in which the light is provided by the lamp of the spotlight, is transmitted via an optical fiber.

19. A spotlight sight comprising a partly reflective inclined panel through which an operator may view a target area, an elongated housing having, at or near an end thereof adjacent the panel focusing means comprising a convex lens adjustably mounted for movement along an axis of said housing, and at or near another end thereof remote from the panel, an inclined mirror and a light source, said light source being positioned transversely of the axis of said housing and directed towards the mirror, the focusing means being arranged to produce a virtual image of the light source, as seen in the panel, at or near the target area as seen through the panel, said panel being adjustable to effect adjustment of horizontal and vertical positions of the virtual image as seen in the panel.

20. In combination a spotlight sight and a spotlight, said sight having a partly reflective panel through which an operator may view a target area, said panel being transverse to an axis of a light beam emitted from a light source and inclined with respect to said axis thereof, said sight having said light source and an imaging means arranged to produce a virtual image of the light beam from said source on the panel, at or near the target area as seen through the panel, said imaging means including an adjustable focusing means arranged to enable the virtual image to be located at a selected distance from the panel corresponding to the distance of the target area, said selected distance being variable between substantially infinity and a closer distance, and means for adjusting the position of the panel to effect adjustment of horizontal and vertical positions of the virtual image as seen in the panel.

* * * * *

UNITED STATES PATENT AND TRADEMARK OFFICE
CERTIFICATE OF CORRECTION

PATENT NO. : 4,988,166

DATED : January 29, 1991

INVENTOR(S) : Paul J. Cook

It is certified that error appears in the above-identified patent and that said Letters Patent is hereby corrected as shown below:

In the Abstract, line 4;
"target, and" should be -- target, the --.
Column 1, line 23;
"show throw" should be -- short throw --.
Column 1, line 66;
"visual image" should be -- virtual image --.
Column 4, line 28;
"proving" should be -- providing --.
Column 4, line 32;
"the mirror" should be -- a mirror --.
Column 4, line 33;
"in the position" should be -- in position --.
Column 5, line 3;
"41" should be -- 51 --.

UNITED STATES PATENT AND TRADEMARK OFFICE
CERTIFICATE OF CORRECTION

PATENT NO. : 4,988,166

DATED : January 29, 1991

INVENTOR(S) : Paul J. Cook

It is certified that error appears in the above-identified patent and that said Letters Patent is hereby corrected as shown below:

Column 6, line 11;
    "will be illuminated" should be -- will illuminate --.
Column 6, line 16;
    "If" should be -- It --.
Column 6, line 38;
    "29 the" should be -- 29 to the --.
Column 6, line 48;
    "and appropriate" should be -- an appropriate --.
Column 7, line 20;
    "claim in" should be -- claimed in --.
Column 8, line 2;
    "adjustably" should be -- adjustable --.

Signed and Sealed this

Eighteenth Day of August, 1992

*Attest:*

DOUGLAS B. COMER

*Attesting Officer*      *Acting Commissioner of Patents and Trademarks*